United States Patent
Ranganathan et al.

(10) Patent No.: US 10,726,975 B2
(45) Date of Patent: Jul. 28, 2020

(54) ELECTRICAL ACCESSORIES FOR POWER TRANSMISSION SYSTEMS AND METHODS FOR PREPARING SUCH ELECTRICAL ACCESSORIES

(71) Applicant: General Cable Technologies Corporation, Highland Heights, KY (US)

(72) Inventors: Sathish Kumar Ranganathan, Avon, IN (US); Vijay Mhetar, Conroe, TX (US); Srinivas Siripurapu, Carmel, IN (US); Cody R. Davis, Maineville, OH (US); Michael Christopher Wright, Marshall, TX (US)

(73) Assignee: General Cable Technologies Corporation, Highland Heights, KY (US)

( * ) Notice: Subject to any disclaimer, the term of this patent is extended or adjusted under 35 U.S.C. 154(b) by 159 days.

(21) Appl. No.: 15/745,284

(22) PCT Filed: Jul. 21, 2016

(86) PCT No.: PCT/US2016/043429
§ 371 (c)(1),
(2) Date: Jan. 16, 2018

(87) PCT Pub. No.: WO2017/015512
PCT Pub. Date: Jan. 26, 2017

(65) Prior Publication Data
US 2018/0211746 A1    Jul. 26, 2018

Related U.S. Application Data

(60) Provisional application No. 62/195,036, filed on Jul. 21, 2015.

(51) Int. Cl.
*H01B 7/42* (2006.01)
*H01B 3/10* (2006.01)
(Continued)

(52) U.S. Cl.
CPC ............. *H01B 7/421* (2013.01); *C09D 1/02* (2013.01); *C09D 5/006* (2013.01); *H01B 1/08* (2013.01);
(Continued)

(58) Field of Classification Search
CPC . C09D 1/02; C09D 5/006; H03B 1/02; H01B 3/02; H01B 1/08; H01B 7/02; H01B 7/421; H01B 13/16; H02G 7/00
See application file for complete search history.

(56) References Cited

U.S. PATENT DOCUMENTS 2,650,975 A    9/1953  Dorst
3,278,673 A    10/1966 Gore
(Continued)

FOREIGN PATENT DOCUMENTS

| CL | 3425-2008 | 11/2008 |
|---|---|---|
| CN | 101002288 A | 7/2007 |

(Continued)

OTHER PUBLICATIONS

Understanding Standard Illuminants, and Observers, obtained from https://measurewhatyousee.com/2014/10/10/understanding-cie-illuminants-and-observers/ (obtained Aug. 19, 2019).*
(Continued)

*Primary Examiner* — Kregg T Brooks
(74) *Attorney, Agent, or Firm* — Ulmer & Berne LLP

(57) ABSTRACT

A coated electrical accessory includes a bare electrical accessory and a substantially inorganic and dried coating layer coating the bare electrical accessory. The coating layer includes a heat radiating agent and a binder. When the coated
(Continued)

electrical accessory is tested in accordance with ANSI CI 19.4-2004 with an amount of imparted current, the coated electrical accessory exhibits an operating temperature that is less than an operating temperature of a bare electrical accessory tested in accordance with ANSI CI 19.4-2004 with the same amount of imparted current. Methods are also provided.

16 Claims, 8 Drawing Sheets

(51) Int. Cl.

| | | |
|---|---|---|
| C09D 1/02 | (2006.01) | |
| H01B 1/08 | (2006.01) | |
| C09D 5/00 | (2006.01) | |
| H01B 3/02 | (2006.01) | |
| H01B 7/02 | (2006.01) | |
| H01B 13/16 | (2006.01) | |
| H02G 7/00 | (2006.01) | |

(52) U.S. Cl.
CPC ............. *H01B 3/02* (2013.01); *H01B 3/10* (2013.01); *H01B 7/02* (2013.01); *H02G 7/00* (2013.01); *H01B 13/16* (2013.01)

(56) References Cited

U.S. PATENT DOCUMENTS

| | | |
|---|---|---|
| 3,383,188 A | 5/1968 | Michelson et al. |
| 3,787,711 A * | 1/1974 | Bright .................. H02B 1/24 361/603 |
| 3,895,956 A | 7/1975 | Yoshida et al. |
| 4,149,367 A | 4/1979 | Eistrat |
| 4,288,252 A | 9/1981 | Neely |
| 4,288,974 A | 9/1981 | Eistrat |
| 4,347,285 A | 8/1982 | Batdorf |
| 4,358,637 A | 11/1982 | Lanfranconi |
| 4,369,204 A | 1/1983 | Wolf et al. |
| 4,383,133 A | 5/1983 | Lanfranconi |
| 4,407,062 A | 10/1983 | Sutcliffe et al. |
| 4,463,219 A | 7/1984 | Sato |
| 4,513,173 A | 4/1985 | Merry |
| 4,575,184 A | 3/1986 | Ueno et al. |
| 4,755,629 A | 7/1988 | Beggs et al. |
| 4,784,461 A | 11/1988 | Abe et al. |
| 4,912,286 A | 3/1990 | Clarke |
| 5,066,330 A | 11/1991 | Holcombe, Jr. et al. |
| 5,091,609 A | 2/1992 | Sawada et al. |
| 5,164,003 A | 11/1992 | Bosco et al. |
| 5,177,809 A | 1/1993 | Zeidler et al. |
| 5,194,087 A | 3/1993 | Berg |
| 5,296,288 A | 3/1994 | Kourtides et al. |
| 5,310,422 A * | 5/1994 | Abdel-Latif .......... C04B 41/009 106/286.1 |
| 5,330,794 A | 7/1994 | Bosco et al. |
| 5,336,851 A | 8/1994 | Sawada et al. |
| 5,372,886 A | 12/1994 | Inazawa et al. |
| 5,468,290 A | 11/1995 | Kelley |
| 5,554,826 A | 9/1996 | Gentry |
| 5,828,007 A | 10/1998 | Fujishita et al. |
| 6,007,873 A | 12/1999 | Holcombe, Jr. et al. |
| 6,013,372 A | 1/2000 | Hayakawa et al. |
| 6,136,434 A | 10/2000 | Jang et al. |
| 6,239,379 B1 | 5/2001 | Cotter et al. |
| 6,295,401 B1 | 9/2001 | Rutterman et al. |
| 6,362,121 B1 | 3/2002 | Chopin et al. |
| 6,589,661 B2 | 7/2003 | Neely, Jr. |
| 6,687,437 B1 | 2/2004 | Starnes et al. |
| 6,797,147 B2 | 9/2004 | Dolan |
| 6,916,414 B2 | 7/2005 | Dolan |
| 6,921,431 B2 | 7/2005 | Evans et al. |
| 6,973,243 B2 | 12/2005 | Koyasu et al. |
| 7,015,395 B2 | 3/2006 | Goldsworthy et al. |
| 7,105,047 B2 | 9/2006 | Simmons et al. |
| 7,244,470 B2 | 7/2007 | Niles |
| 7,313,909 B2 | 1/2008 | Skoog et al. |
| 7,354,650 B2 | 4/2008 | Nakajima et al. |
| 7,438,971 B2 | 10/2008 | Bryant et al. |
| 7,449,245 B2 | 11/2008 | Akarsu et al. |
| 7,534,964 B2 | 5/2009 | Clark et al. |
| 7,612,289 B2 | 11/2009 | Lique et al. |
| 7,643,713 B2 | 1/2010 | Buthe et al. |
| 7,752,754 B2 | 7/2010 | Goldsworthy et al. |
| 7,820,300 B2 | 10/2010 | Dolan |
| 7,834,271 B2 | 11/2010 | Gromko et al. |
| 7,897,875 B2 | 3/2011 | Gareis |
| 7,954,518 B2 | 6/2011 | Torrance et al. |
| 8,204,348 B2 | 10/2012 | Keller et al. |
| 8,295,665 B2 | 10/2012 | Herbest |
| 8,319,104 B2 | 11/2012 | Camp, II et al. |
| 8,361,630 B2 | 1/2013 | Dolan |
| 8,625,946 B2 | 1/2014 | Kachmar |
| 8,718,428 B2 | 5/2014 | Hurley et al. |
| 9,011,791 B2 | 4/2015 | Olver et al. |
| 2004/0016503 A1 | 1/2004 | Stowe |
| 2005/0064094 A1 | 3/2005 | Wojtysiak et al. |
| 2005/0279074 A1 | 12/2005 | Johnson et al. |
| 2005/0279527 A1 | 12/2005 | Johnson et al. |
| 2006/0237221 A1 | 10/2006 | Glew |
| 2007/0148479 A1 | 6/2007 | Ishikazi et al. |
| 2007/0193767 A1 | 8/2007 | Guery et al. |
| 2007/0193769 A1 | 8/2007 | Clark et al. |
| 2008/0128155 A1 | 6/2008 | Guery et al. |
| 2008/0210567 A1 | 9/2008 | Karuppuchamy et al. |
| 2008/0264670 A1 | 10/2008 | Glew |
| 2009/0078439 A1 | 3/2009 | Wiekhorst |
| 2009/0114420 A1 | 5/2009 | Winterhalter |
| 2009/0126971 A1 | 5/2009 | Fok |
| 2009/0196986 A1 * | 8/2009 | Cordaro ............... B64G 1/226 427/126.4 |
| 2009/0293786 A1 | 12/2009 | Olver |
| 2010/0076719 A1 | 3/2010 | Lawry et al. |
| 2010/0252241 A1 | 10/2010 | McDermott et al. |
| 2012/0074122 A1 | 3/2012 | Olver et al. |
| 2012/0090892 A1 | 4/2012 | Meyer et al. |
| 2012/0106591 A1 | 5/2012 | Springer, III |
| 2012/0141778 A1 | 6/2012 | Phipps |
| 2012/0172209 A1 | 7/2012 | Lu et al. |
| 2012/0222883 A1 | 9/2012 | Nordin et al. |
| 2012/0267141 A1 | 10/2012 | Kamiyama et al. |
| 2012/0312579 A1 | 12/2012 | Kenny et al. |
| 2013/0014972 A1 | 1/2013 | Wiebelhaus et al. |
| 2014/0041925 A1 | 2/2014 | Davis et al. |
| 2014/0238867 A1 | 8/2014 | Ranganathan et al. |
| 2015/0104641 A1 * | 4/2015 | Mhetar ............... H01B 1/023 428/366 |
| 2015/0235739 A1 | 8/2015 | Davis et al. |

FOREIGN PATENT DOCUMENTS

| | | |
|---|---|---|
| CN | 200979826 Y | 11/2007 |
| CN | 101125979 A | 2/2008 |
| CN | 201773611 U | 3/2011 |
| CN | 101752023 B | 9/2011 |
| CN | 102439093 A | 5/2012 |
| CN | 102446578 A | 5/2012 |
| CN | 102471637 A | 5/2012 |
| CN | 102977700 A | 3/2013 |
| CN | 203038717 U | 7/2013 |
| DE | 3824608 C1 | 8/1989 |
| DE | 9410584.7 | 9/1994 |
| EP | 0756289 A1 | 1/1997 |
| EP | 0981192 A1 | 2/2000 |
| EP | 2544190 A1 | 1/2013 |
| ES | 2015171 A6 | 8/1990 |
| FR | 2971617 A1 | 8/2012 |
| GB | 437310 | 10/1935 |
| GB | 2079521 A | 1/1982 |
| GB | 2123164 | 1/1984 |
| JP | S57-180808 A | 11/1982 |
| JP | H04-075206 A | 3/1992 |

(56) References Cited

FOREIGN PATENT DOCUMENTS

| JP | 8-315653 A | 11/1996 |
|---|---|---|
| JP | 2001-52539 | 2/2001 |
| JP | 2003-132746 | 5/2003 |
| JP | 2009-026699 A | 2/2009 |
| MX | 2011009259 A | 8/2012 |
| RU | 2386183 C1 | 4/2010 |
| WO | 99/048182 A1 | 9/1999 |
| WO | 2004109797 A1 | 12/2004 |
| WO | 2005005680 A2 | 1/2005 |
| WO | 2007034248 A1 | 3/2007 |
| WO | 2010042191 A1 | 4/2010 |
| WO | 2011090133 A1 | 7/2011 |
| WO | 2006136335 A1 | 12/2016 |

OTHER PUBLICATIONS

Tayal, Neeraj; Examination Report issued in Indian Patent Application No. 817/CHENP/2015; dated Nov. 20, 2018; 5 pages.
Vanier, Cecile; Examination Report issued in European Patent Application No. 14756868.7; dated Nov. 14, 2018; 5 pages.
Campos M., Celia; Examination Report issued in Chilean Patent Application No. 2015-2382; dated Jun. 19, 2017; 22 pages, including English translation.
Office Action issued in Taiwanese Patent Application No. 102138290; dated Jul. 28, 2017; 14 pages, including English translation.
Zhang, Qiuhong; Office Action issued in Chinese Patent Application No. 201380053188.X; dated Aug. 14, 2017; 17 pages, including English translation.
Varghese, Roshn; Non-final Office Action issued in U.S. Appl. No. 14/185,429; dated Sep. 7, 2017; 28 pages.
Paden, Leodelino C.; Substantive Examination Report issued in Philippines Patent Application No. 1-2015-500273; dated Sep. 5, 2017; 2 pages.
Alvear, Mariana Olimpia Castro; Office Action issued in Mexican Patent Application No. MX/a/2015/001771; dated Jun. 27, 2017; 16 pages, including English translation.
Lopez, Ricardo; Final Office Action issued in U.S. Appl. No. 14/701,220; dated Jul. 13, 2017; 8 pages.
Murata, Austin; Non-Final Office Action issued in U.S. Appl. No. 13/863,902; dated Jun. 27, 2017; 15 pages.
Alaqil; Saleh, M.; Examination Report issued in GCC Patent Application No. GC 2013-25627; dated Feb. 8, 2017; 4 pages.
Vanier, Cecile; Extended European Search Report, including supplementary European search report and European search opinion, issued in European Patent Application No. 14756868.7; dated Aug. 16, 2016; 6 pages.
Vargas, Hector Javier Sanchez; Office Action issued in Mexican Patent Application No. MX/a/2015/001771; dated Dec. 7, 2016; 14 pages, including English translation.
Akagashi, Yuki; Notice of Reasons for Rejection issued in Japanese Patent Application No. 2015-526528; dated Dec. 19, 2016; 11 pages including English translation.

Second Office Action issued in Chinese Patent Application No. 201380053188.X; dated Jan. 26, 2017; 8 pages, including English translation.
Gonzalez; Cecilia Veronica Lanas; Office Action issued in Chilean Patent Application No. 0320-2015; dated Feb. 3, 2017; 18 pages, including English translation.
Sanchez, Ronaldo; Examination Report No. 1 for Standard Patent Application, issued in Australian Patent Application No. 2014223867; dated Feb. 10, 2017; 3 pages.
Gonzalez; Cecilia Veronica Lanas; Office Action issued in Chilean Patent Application No. 0320-2015; dated Jul. 27, 2016; 17 pages, including English translation.
Gnanasingham, Soosa; Patent Examination Report No. 1, issued in Australian Patent Application No. 2013300127; dated Jul. 22, 2016; 4 pages.
Vargas, Hector Javier Sanchez; Office Action issued in Mexican Patent Application No. MX/a/2015/001771; dated Jun. 14, 2016; 11 pages, including partial English translation.
Young, Lee W.; International Search Report and Written Opinion of the International Searching Authority, issued in International Application No. PCT/US2016/043429; dated Oct. 13, 2016; 7 pages.
Zhang, Qiuhong; First Office Action and Search Report, issued in Chinese Patent Application No. 201380053188.X; dated Mar. 31, 2016; 27 pages, including English translation.
Hillmayr, Heinrich; Extended European Search Report, including supplementary European search report and European search opinion, issued in European Patent Application No. 13827181.2; dated Mar. 16, 2016; 9 pages.
Schedrina, O.; International Search Report and Written Opinion of the International Searching Authority, issued in International Application No. PCT/US2013/037433; dated Aug. 8, 2013; 5 pages.
Kim, Tae Hoon; International Search Report and Written Opinion of the International Searching Authority, issued in International Application No. PCT/US2014/017736; dated May 20, 2014; 13 pages.
Copenheaver, Blaine R.; International Search Report and Written Opinion of the International Searching Authority, issued in International Application No. PCT/US2014/062181; dated Feb. 9, 2015; 9 pages.
Thomas, Shane; International Search Report and Written Opinion of the International Searching Authority, issued in International Application No. PCT/US2015/010619; dated Mar. 25, 2015; 8 pages.
Thomas, Shane; International Search Report and Written Opinion of the International Searching Authority, issued in International Application No. PCT/US2015/035137; dated Sep. 4, 2015; 9 pages.
Thomas, Shane; International Search Report and Written Opinion of the International Searching Authority, issued in International Application No. PCT/US2015/010637; dated Mar. 25, 2015; 9 pages.
Lopez, Ricardo E.; Non-Final Office Action issued in U.S. Appl. No. 14/701,220; dated Oct. 21, 2016; 14 pages.
Sato, Takahiko; Notice of Reasons for Rejection issued in Japanese Patent Application No. 2015-559003; dated Jan. 15, 2018; 9 pages, including English translation.
Sanchez, Ronaldo; Examination Report No. 2 issued in Australian Patent Application No. 2014223867; dated Jan. 30, 2018; 3 pages.

\* cited by examiner

US 10,726,975 B2

ELECTRICAL ACCESSORIES FOR POWER TRANSMISSION SYSTEMS AND METHODS FOR PREPARING SUCH ELECTRICAL ACCESSORIES

REFERENCE TO RELATED APPLICATIONS

The present application claims the priority benefit of U.S. Provisional Patent App. No. 62/195,036, entitled "ELECTRICAL ACCESSORIES FOR POWER TRANSMISSION SYSTEMS AND METHODS FOR PREPARING SUCH ELECTRICAL ACCESSORIES", filed Jul. 21, 2015, and hereby incorporates the same application by reference herein.

TECHNICAL FIELD

The present disclosure relates to coated electrical accessories for power transmission systems that operate at lower temperatures.

BACKGROUND

As the need for electricity continues to grow, the need for higher capacity transmission and distribution lines grows as well. The amount of power a transmission line can deliver is dependent on the current-carrying capacity (ampacity) of the line. The ampacity of a line is limited by the maximum safe operating temperature of the bare conductor that carries the current. Exceeding this temperature can result in damage to the conductor or to the line accessories. Moreover, the conductor gets heated by Ohmic losses and solar heat and is cooled by conduction, convection and radiation. The amount of heat generated due to Ohmic losses depends on current (I) passing through it and its electrical resistance (R) by the relationship Ohmic losses=$I^2R$. Electrical resistance (R) itself is dependent on temperature. Higher current and temperature can lead to higher electrical resistance, which, in turn, can lead to more electrical losses in the conductor. Prior attempts to overcome these issues have proposed coating overhead conductors with white spectrally selective coating surfaces or polymeric coatings having high emissivity. However, white coatings are undesirable due to glare and discoloration over time while polymeric coatings are undesirable due to their questionable heat and wet aging characteristics. Therefore, there remains a need for a durable, inorganic coating for overhead conductors and related electrical accessories that allow the conductors and/or electrical accessories to operate at reduced temperatures.

SUMMARY

According to one embodiment, a coated electrical accessory energizable to facilitate distribution of power includes a bare electrical accessory and a substantially inorganic and dried coating layer coating the bare electrical accessory. The coating layer includes a binder and a heat radiating agent. The binder is about 20% to about 60%, by dry weight, of the coating layer. The binder includes a metal silicate selected from the group consisting of sodium silicate, potassium silicate, lithium silicate, or combinations thereof. When tested in accordance to ANSI C119.4-2004, the operating temperature of the coated electrical accessory is lower than the operating temperature of the bare electrical accessory when the same current is applied.

According to another embodiment, a coated electrical accessory energizable to facilitate distribution of power includes a bare electrical accessory and a substantially inorganic and dried coating layer coating the bare electrical accessory. The coating layer has a solar absorptivity coefficient of about 0.4 or greater. The coating layer includes a binder and a heat radiating agent. The binder is about 15% to about 65%, by dry weight, of the coating layer. The binder includes a metal silicate selected from the group consisting of sodium silicate, potassium silicate, lithium silicate, or combinations thereof. When tested in accordance to ANSI C119.4-2004, the operating temperature of the coated electrical accessory is lower than the operating temperature of the bare electrical accessory when the same current is applied.

According to another embodiment, a coated electrical accessory energizable to facilitate distribution of power includes a bare electrical accessory and a substantially inorganic and dried coating layer coating the bare electrical accessory. The coating layer includes a binder and a heat radiating agent. The binder is about 15% to about 65%, by dry weight, of the coating layer. The binder includes a metal silicate selected from the group consisting of sodium silicate, potassium silicate, lithium silicate, or combinations thereof. When tested in accordance to ANSI C119.4-2004, the operating temperature of the coated electrical accessory is lower than the operating temperature of the bare electrical accessory when the same current is applied. The coated electrical accessory passes the Mandrel Bend Test after heat aging at 325° C. for 1 day.

DETAILED DESCRIPTION

Figure 1:
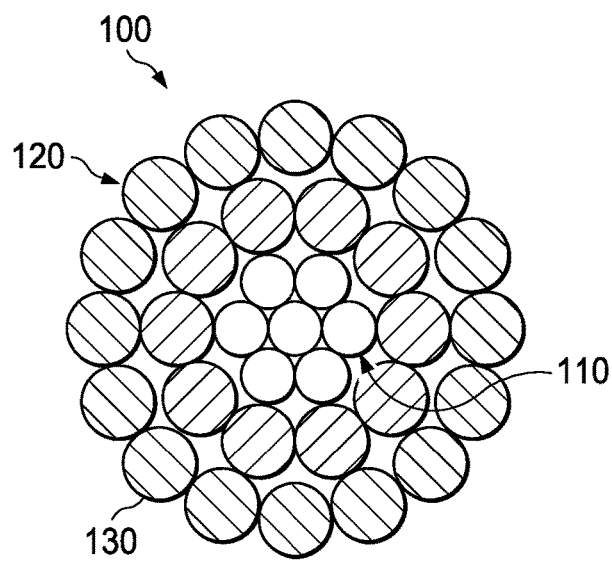
FIG. 1 is a cross sectional view of a bare conductor having a plurality of core wires according to one embodiment.
Figure 3:
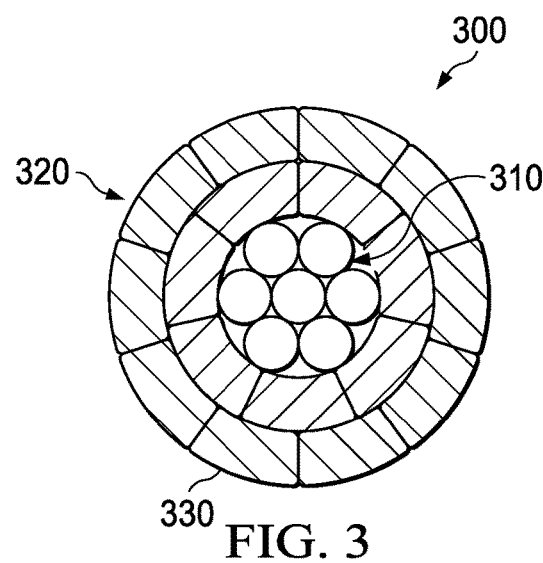
FIG. 3 is a cross sectional view of a bare conductor formed of trapezoidal shaped conductive wires and having a plurality of core wires according to one embodiment.
Figure 2:
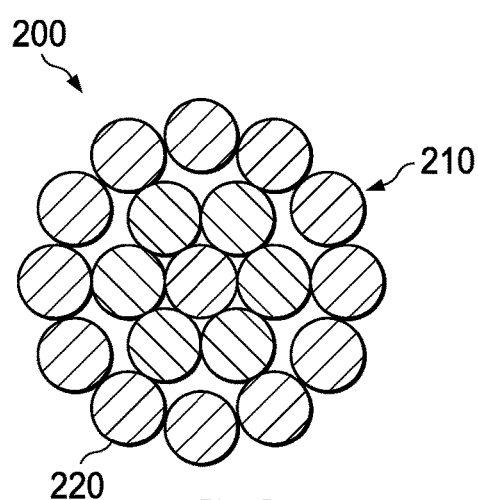
FIG. 2 is a cross sectional view of a bare conductor without core wires according to one embodiment.
Figure 4:
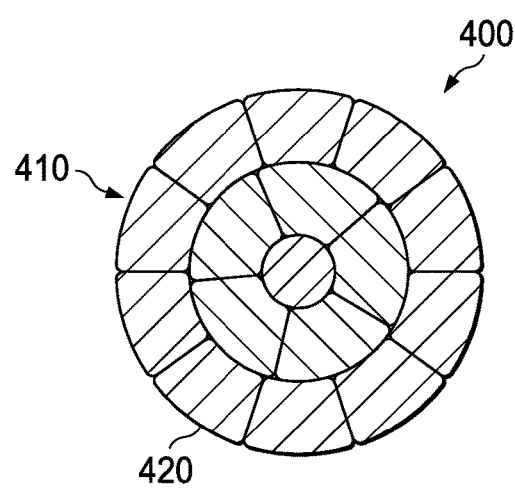
FIG. 4 is a cross sectional view of a bare conductor formed from trapezoidal shaped conductive wires and without core wires according to one embodiment.

The present disclosure provides an outer coating that can include a heat radiating agent (e.g., a heat emissive coating)

that can be provided on an overhead conductor or electrical accessories. The heat emissive coating can have durable heat and wet aging characteristics. The heat emissive coating, when tested in accordance to ANSI C119.4-2004, can reduce the operating temperature of an overhead conductor and/or electrical accessories as compared to the operating temperature of the same overhead conductor and/or electrical accessories without the heat radiating agent. The heat emissive coating can also increase the ampacity load of an overhead conductor and/or electrical accessories (e.g., 1900 amps) as compared to the ampacity load of the same overhead conductor and/or electrical accessories without the heat radiating agent (e.g., 1500 amps) when operated at the same temperature. That is, the heat emissive coating for an overhead conductor and/or electrical accessories can conduct higher amperage than a bare electrical accessory when operated at the same voltage. The heat radiating agent can be incorporated directly into the overhead conductor or can be coated on the overhead conductor. According to certain embodiments, the operating temperature can be reduced by at least 5° C. It is to be appreciated that the heat emissive coating can be provided on a variety of electrical components or other metal components, including electrical accessories that are energized with electricity and thus generate heat. Various examples of these electrical accessories will be described further herein. Methods for coating an overhead conductor with an inorganic, flexible coating that can reduce the operating temperature of the conductor compared to the temperature of the same conductor without the heat radiating agent are also disclosed.

As can be appreciated, the temperature of a conductor is dependent on a number of factors including the electrical properties of the conductor, the physical properties of the conductor, and the local weather conditions. For example, a conductor will increase in temperature by absorbing heat from the sun due to solar radiation. The amount of heat absorbed is dependent on the surface of the conductor, that is, the surface's coefficient of absorptivity ("absorptivity"). A low absorptivity indicates that the conductor absorbs only a small amount of heat due to solar radiation.

A conductor can reduce its temperature by emitting heat through radiation. The amount of heat radiated is dependent on the conductor surface's coefficient of emissivity ("emissivity"). A high emissivity indicates that the conductor is radiating more heat than a conductor with low emissivity.

In certain embodiments, the present disclosure provides a bare overhead conductor with a surface coating to decrease the operating temperature of the conductor without significant change to any electrical or mechanical properties, such as electrical resistance, corona, elongation at rupture, tensile strength, and modulus of elasticity for example. CIE Publication 15.2(1986), section 4.2 recommends the CIE L*, a*, b* color scale for use. The color space is organized as a cube. The L* axis runs from top to bottom. The maximum for L* is 100, which represents a perfect reflecting diffuser or white. The minimum for L* is 0, which represents black.

In certain embodiments, the heat emissivity coefficient of the coating layer can be greater than or equal to 0.5, can be greater than 0.7, or can be greater than about 0.8. In certain embodiments, the absorptivity coefficient of the coating layer can be about 0.5 or less, and in certain embodiments, the absorptivity coefficient of the coating layer can be about 0.3 or less. In certain embodiments, the absorptivity coefficient can be a solar absorptivity coefficient. Because conductor coatings tends to crack due to thermal expansion of the wire during heating and cooling, the coefficient of expansion of the surface coating preferably matches that of the cable conductor. For the present disclosure, a coefficient of expansion of the coating can be in the range of about $10 \times 10^{-6}/°$ C. to about $100 \times 10^{-6}/°$ C., over a temperature range of 0° C. to 250° C.

According to certain embodiments, the disclosed coating layers can also exhibit favorable heat aging characteristics and can pass certain heat aging qualifications. For example, overhead conductors that are designed to operate at maximum temperatures of 75° C. to 250° C. can pass an accelerated heat aging test. Accelerated heat aging can be carried out by placing the samples in an air circulating oven maintained at 325° C. for a period of either 1 day or 7 days. After the thermal aging is complete, samples placed at room temperature (e.g., 21° C.) for a period of 24 hours are bent on cylindrical mandrels of decreasing diameter and observed for any visible cracks at each of the mandrel sizes. Results are compared with the flexibility of the coating prior to thermal aging.

In certain embodiments, a coating layer (coating composition) of the present disclosure can include a binder and a heat radiating agent. Such coating compositions, when coated on a bare conductor wire as a surface layer, can allow the conductor to better dissipate heat generated by the conductor during operation. As can be appreciated, the coating composition can also include other optional ingredients, such as fillers, stabilizers, colorants, surfactants and infrared (IR) reflective additives. The coating composition can, in certain embodiments, contain only inorganic ingredients. In certain such embodiments, organic ingredients can be limited to less than about 10% by weight of the dry coating composition (wt %), or can be limited to less than 5% by weight of the dry coating composition. Once coated onto a conductor and dried, the coating layer can be less than 200 microns thick, less than 100 microns thick, or less than 30 microns thick. In certain embodiments, the thickness can be least 5 microns thick. In certain embodiments, a coating composition can have a L* value of less than 95 and/or can have an absorptivity of less than about 0.5, or less than about 0.3. In certain embodiments, a coating composition can have a L* value between about 10 to about 95; and in certain embodiments, a coating composition can have a L* value between about 30 and about 95. The coatings can be electrically non-conductive, semi-conductive, or conductive.

In certain embodiments, one or more binders can be included in a coating composition. For example, a binder can be included at a concentration of about 15% to 65% (by weight of the total dry composition). The binder can contain a functional group, such as hydroxyl, epoxy, amine, acid, cyanate, silicate, silicate ester, ether, carbonate, maleic, etc. Inorganic binders can include, but are not limited to, metal silicates, such as potassium silicate, sodium silicate, lithium silicate and magnesium aluminum silicate; peptized aluminum oxide monohydrate; colloidal silica; colloidal alumina; aluminum phosphate and combinations thereof.

According to certain embodiments, one or more heat radiating agents can be included in a coating composition at a concentration of about 1% to 30% (by weight of the total dry composition). The heat radiating agents can include, but are not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, manganese oxide, chromium oxides, iron oxide, boron carbide, boron silicide, copper chromium oxide, tricalcium phosphate, aluminum nitride, boron nitride, alumina, magnesium oxide, calcium oxide, and combinations thereof.

Further, one or more IR reflective additives can be included in a coating composition. Generally, IR reflective additives can include, but are not limited to, cobalt, aluminum, bismuth, lanthanum, lithium, magnesium, neodymium, niobium, vanadium, ferrous, chromium, zinc, manganese, and nickel based metal oxides and ceramics. Typically the IR reflective additives can be used at 0.1% to 5% (by weight of the total dry composition) either individually or mixed with colorants.

One or more stabilizers can also be included in the coating composition and can be included at a concentration of about 0.1% to 2% (by weight of the total dry composition). Examples of such stabilizers can include, but are not limited to, dispersion stabilizers, such as bentonites.

In certain embodiments, one or more colorants can be included in a coating composition and can be included at a concentration of about 0.02% to 0.2% (by weight of the total dry composition). The colorant can be organic or inorganic pigments, which can include, but are not limited to, rutile, anatine, brookite, cadmium yellow, cadmium red, cadmium green, orange cobalt, cobalt blue, cerulean blue, aureolin, cobalt yellow, copper pigments, azurite, Han purple, Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (ultramarine, ultramarine green shade), zinc pigments (zinc white, zinc ferrite), and combinations thereof.

According to certain embodiments, one or more surfactants can also be included in a coating composition. In such embodiments, the one or more surfactants can be included at a concentration of about 0.05% to 0.5% (by weight of the total dry composition). Suitable surfactants can include, but are not limited to, cationic, anionic, or non-ionic surfactants, and fatty acid salts.

As can be appreciated, other components/additives suitable for inclusion in the present disclosure can be found in U.S. Pat. No. 6,007,873 to Holcombe Jr. et al., U.S. Pat. No. 7,105,047 to Simmons et al., and U.S. Pat. No. 5,296,288 to Kourtides et al., which are each incorporated herein by reference.

According to certain embodiments, an example coating composition can include 51.6 weight percent cerium oxide powder and 48.4 weight percent of an aluminum phosphate binder solution. The aluminum phosphate binder solution can include 57 weight percent mono aluminum phosphate trihydrate ($Al(H_2 PO_4)_3$), 2 weight percent phosphoric acid, and 41 weight percent water.

According to certain embodiments, another exemplary coating composition can contain boron carbide or boron silicide as an emissivity agent and a binder solution. The binder solution can contain a mixture of sodium silicate and silicon dioxide in water, with the dry weight ratio in the coating of sodium silicate to silicon dioxide being about 1:5. The loading of the boron carbide can be such that it constitutes 2.5 wt % to 7.5 wt % of the total coating dry weight.

According to certain embodiments, another example coating composition can contain colloidal silicon dioxide as a binder and silicon hexaboride powder as an emissivity agent. The loading of the silicon hexaboride can be such that it constitutes 2.5 wt % to 7.5 wt % of the total coating dry weight.

According to certain embodiments, a coating composition can contain less than about 5% organic material. In such embodiments, a coating composition can contain sodium silicate, aluminum nitride, and an amino functional siloxane (silicone modified to contain amino functional group(s)). The sodium silicate can be included at about 60 wt % to 90 wt % solution in water (containing 40% solid), or at about 67.5 wt % to 82.5 wt %. The aluminum nitride can be included at about 10 wt % to 35 wt % of the dry coating composition, or at 15 wt % to 30 wt %. The amino functional siloxane can be included at about less than about 5 wt % of the dry coating composition, or at about 2 wt % to 3 wt %. The aluminum nitride can have a specific surface area of less than 2 $m^2/g$ and/or can have a particle size distribution of: D 10%-0.4-1.4 microns, D 50%-7-11 microns, and D 90% 17-32 microns. The amino functional siloxane can be amino dimethylpolysiloxane. Further, a dimethylpolysiloxane can have a viscosity of about 10 to 50 centistokes at 25° C. and/or an amine equivalent of 0.48 milliequivalents of base/gram.

Once the conductor and/or electrical accessories are coated with a heat emissive coating, the coating can be cured. In certain embodiments, the heat emissive coating can be cured through application of heat (e.g., with a heat gun or flame). In other embodiments, the heat emissive coating can be cured through exposure to ambient temperatures (e.g., room temperature). Once cured, the coating can offer a flexible coating that exhibits no visible cracks when bent on mandrels having diameters ranging from 0.5 inch to 10 inches. The cured coating can be heat resistant and can pass the same mandrel bent test after heat aging at 325° C. for a period of either 1 day or 7 days.

A coating composition can be applied around a variety of cables including high voltage overhead electricity transmission lines and related electrical accessories. As can be appreciated, such overhead electricity transmission lines can be formed in a variety of configurations and can generally include a core formed from a plurality of conductive wires. For example, aluminum conductor steel reinforced ("ACSR") cables, aluminum conductor steel supported ("ACSS") cables, aluminum conductor composite core ("ACCC") cables and all aluminum alloy conductor ("AAAC") cables. ACSR cables are high-strength stranded conductors and include outer conductive strands, and supportive center strands. The outer conductive strands can be formed from high-purity aluminum alloys having a high conductivity and low weight. The center supportive strands can be steel and can have the strength required to support the more ductile outer conductive strands. ACSR cables can have an overall high tensile strength. ACSS cables are concentric-lay-stranded cables and include a central core of steel around which is stranded one, or more, layers of aluminum, or aluminum alloy, wires. ACCC cables, in contrast, are reinforced by a central core formed from one, or more, of carbon, glass fiber, aluminum oxide fiber or polymer materials. A composite core can offer a variety of advantages over an all-aluminum or steel-reinforced conventional cable as the composite core's combination of high tensile strength and low thermal sag enables longer spans. ACCC cables can enable new lines to be built with fewer supporting structures. AAAC cables are made with aluminum or aluminum alloy wires. AAAC cables can have a better corrosion resistance, due to the fact that they are largely, or completely, aluminum. ACSR, ACSS, ACCC, and AAAC cables can be used as overhead cables for overhead distribution and transmission lines.

As can be appreciated, a cable can also be a gap conductor. A gap conductor can be a cable formed of trapezoidal shaped temperature resistant aluminum zirconium wires surrounding a high strength steel core.

FIGS. 1, 2, 3, and 4 each illustrate various bare overhead conductors according to certain embodiments. Overhead conductors 100, 200, 300 and 400 can generally include only one or more conductive wires 210 and 410 like in FIGS. 2 and 4, or conductive wires 120, 210, 320 and 410 surrounding the cores 110 and 310 like in FIGS. 1 and 3. Each overhead conductor depicted in FIGS. 1-4 can include a coating (130, 220, 330 and 420) formed from the coating composition. Additionally, FIGS. 1 and 3 can, in certain embodiments, be formed as ACSR cables through selection of steel for the core and aluminum for the conductive wires. Likewise, FIGS. 2 and 4 can, in certain embodiments, be formed as AAAC cables through appropriate selection of aluminum or aluminum alloy for the conductive wires.

In alternate embodiments the cores 110, 310 can be steel, invar steel, composite materials, any other material that can provide strength to the conductor. In other alternate embodiments the conductive wires 120, 210, 320, 410 can be made of any suitable conductive material including copper, a copper alloy, aluminum, an aluminum alloy, including aluminum types 1350, 6000 series alloy aluminum, aluminum-zirconium alloy, carbon nanotube, grapheme, or any other conductive material.

Composite core conductors are useful due to lower sag at higher operating temperatures and their higher strength to weight ratio. Composite materials are based on glass fiber, carbon fiber, polymeric fibers, aluminum oxide fiber reinforced in aluminum or any other material that can provide strength and lower sag to the conductor. A polymeric coating can also, or alternatively, be utilized in composite core conductor designs. As can be appreciated, a composite core conductor with the coating formed from a coating composition can have a further reduction in conductor operating temperatures due to the coating and can have both a lower sag and lower degradation of certain polymer resins in the composite from the lowered operating temperatures. Non-limiting examples of composite cores can be found in U.S. Pat. Nos. 7,015,395, 7,438,971, 7,752,754, U.S. Pat. App. No. 2012/0186851, U.S. Pat. Nos. 8,371,028, 7,683,262, and U.S. Patent App. No. 2012/0261158, each of which are incorporated herein by reference.

According to certain embodiments, a coating composition can be made in a High Speed Disperser (HSD), a Ball Mill, a Bead mill or by using other techniques known in the art. In certain embodiments, a HSD can be used to make the coating composition. To make the coating composition, the binders, dispersion medium and surfactant (if used) can be added to a High Speed Disperser to prepare a solution. Into that solution, the heat radiating agent, fillers, stabilizers, colorants and others additives can be slowly added. Initially, a lower stirrer speed can be used to remove the entrapped air; afterwards the speed can be increased gradually up to 3,000 rpm. The high speed mixing can be performed until the desired dispersion of the fillers and other additives is achieved in the coating. In certain embodiments, porous fillers can be pre-coated with the binder solution prior to their addition into the mixture. The dispersion medium can be water or an organic solvent. Examples of organic solvents can include, but are not limited to, alcohols, ketones, esters, hydrocarbons, and combinations thereof. In certain embodiments, the dispersion medium can be water. The resulting coating mixture can be a suspension with a total solid content of about 40% to 80%. As can be appreciated, upon storage of this mixture, the solid particles can settle. In such scenarios, the coating mixture can be stirred and/or can be further be diluted to achieve the required viscosity before being transferring in to the coating applicator.

In certain embodiments, the surface of the overhead conductor can be prepared prior to the application of the coating composition. The preparation process can be chemical treatment, pressurized air cleaning, hot water or steam cleaning, brush cleaning, heat treatment, sand blasting, ultrasound, deglaring, solvent wipe, plasma treatment, and the like. For example, in certain embodiments, the surface of the overhead conductor can be deglared by sand blasting.

According to certain embodiments, the coating mixture composition can be applied by a spray gun using, for example, 10-45 PSI pressure; the PSI can be controlled through the air pressure. In certain such embodiments, the spray gun nozzle can be placed substantially perpendicular to the direction of the conductor (e.g., at an approximately 90° angle) to obtain a uniform coating on the conductor product. In certain embodiments, two or more guns can be used to get more efficient coatings. The coating thickness and density can be controlled by the admixture viscosity, gun pressure, and conductor line speed. During the coating application, the overhead conductor temperature can be between 10° C. to 90° C. depending on the material of the conductor.

Alternatively, in certain embodiments, the coating mixture can be applied to the overhead conductor by one of dipping, a brush, or a roller. In such embodiments, the cleaned and dried conductor can be dipped into the coating mixture to allow the mixture to completely coat the conductor. The conductor can then be removed from the coating mixture and allowed to dry.

After application, the coating on the overhead conductor can be allowed to dry by evaporation either at room temperature or at elevated temperatures of up to 325° C. In certain embodiments, the coating can be dried by direct flame exposure which exposes the coating to intense, but brief (e.g., about 0.1 to 2 seconds, or about 0.5 to 1 second) heating.

As can be appreciated, the heat emissive coating can be applied to both new conductors as well as to aged overhead conductors (i.e., overhead conductors which are already in service). Existing conductors can be coated with a robotic system for automated or semi-automated coating. The automated system functions in three steps: (1) cleaning the conductor surface; (2) applying the coating on the conductor surface; and (3) drying the coating. Coating on existing conductors can be dried at ambient temperature or through heat. Coating of aged conductors in this manner can further enhance their overall heat emissivity relative to the heat emissivity provided by any galvanic corrosion on the conductor surface.

The coating can be applied to a conductor in several ways. For example, a coating can be applied by coating the individual wires before their assembly in the bare overhead conductor. In such embodiments, it is possible to coat all of the wires of the conductor, or more economically, only the outer most wires of the conductor. Alternatively, the coating can be applied only to the outer surface of a bare overhead conductor. In such embodiments, the complete outer surface can be coated or only a portion thereof can be coated.

Figure 10:
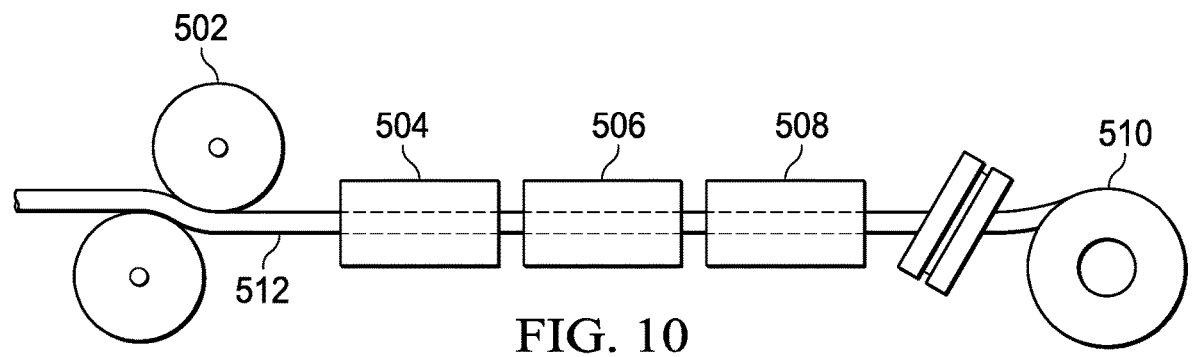
FIG. 10 is a drawing showing a continuous process in accordance with one embodiment.

The coating can be applied in a batch process, a semi-batch process, or a continuous process. FIG. 10 illustrates a continuous coating process. As depicted by FIG. 10, a conductor 512 can be unwound from winding roll 502, passed through a surface preparation process via a pretreatment unit 504, and coated in coating unit 506. After the coating is applied, the conductor can be dried via a drying/curing unit 508. Once dried, the cable is wound on a roller 510. In one embodiment, the heat emissive coating can be applied via a batch process that prevents the ends of the conductor from being coated which can enhance the electrical connectivity between the ends and connected accessories (e.g., termination points).

In the pretreatment unit 504, a surface of the conductor 512, can be prepared by media blasting. In certain embodiments, the media is sand, however, glass beads, ilmenite, steel shot, could also be used. The media blasting can be followed by air-wiping to blow the particulate materials off the conductor 512. An air-wipe consists of jets of air blown on to the conductor 512 at an angle and in a direction opposing the direction of travel of the conductor 512. The air jets create a 360° ring of air that attaches to the circumference of the conductor 512 and wipes the surface with the high velocity of air. In such embodiments, as the conductor exits the pretreatment unit 504, any particles on the conductor 512 are wiped and blown back into the pretreatment unit 504. An air jet can typically operate at about 60 to about 100 PSI, preferably about 70-90 PSI, more preferably about 80 PSI. The air jet can have a velocity (coming out of the nozzles) of about 125 mph to about 500 mph in certain embodiments, about 150 mph to about 400 mph in certain embodiments, and about 250 mph to about 350 mph in certain embodiments. After the air-wipe, the number of particles that are greater than 10 microns in size on the surface of the conductor can be lower than 1,000 per square feet of the conductor surface in certain embodiments, or less than 100 per square feet of the surface in certain embodiments. After the air wipe, the conductor can be heated, e.g. by a heating oven, UV, IR, E-beam, open flame, and the like. The heating can be accomplished by a single unit or by multiple units. In certain embodiments, the drying/curing can occur by direct flame application. In such embodiments, the cable is passed directly through a flame to heat the cable surface to a temperature above ambient temperature. High heating temperature in pretreatment allows for a lower heating temperature later in the drying/curing unit. However, the heating can be limited to avoid affecting the quality of the coating (e.g. adherence, evenness, blistering etc.). For example, the conductor can be heated to less than above about 140° C. in certain embodiments, and above no more than about 120° C. in certain embodiments.

Figure 11:
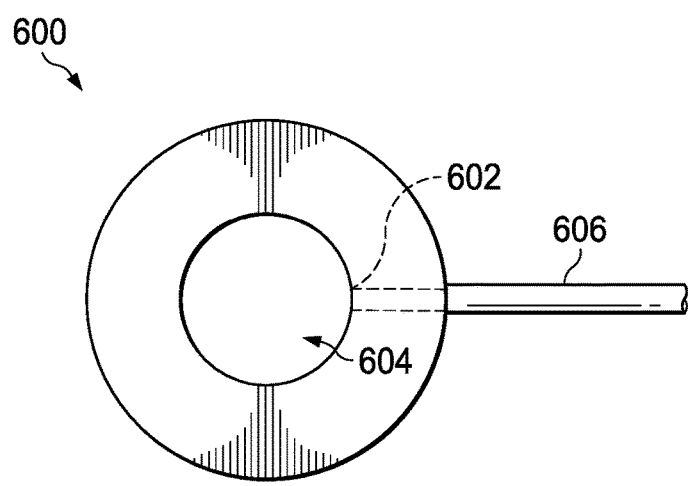
FIG. 11 is drawing showing a cross-section of the flooded die.
Figure 12:
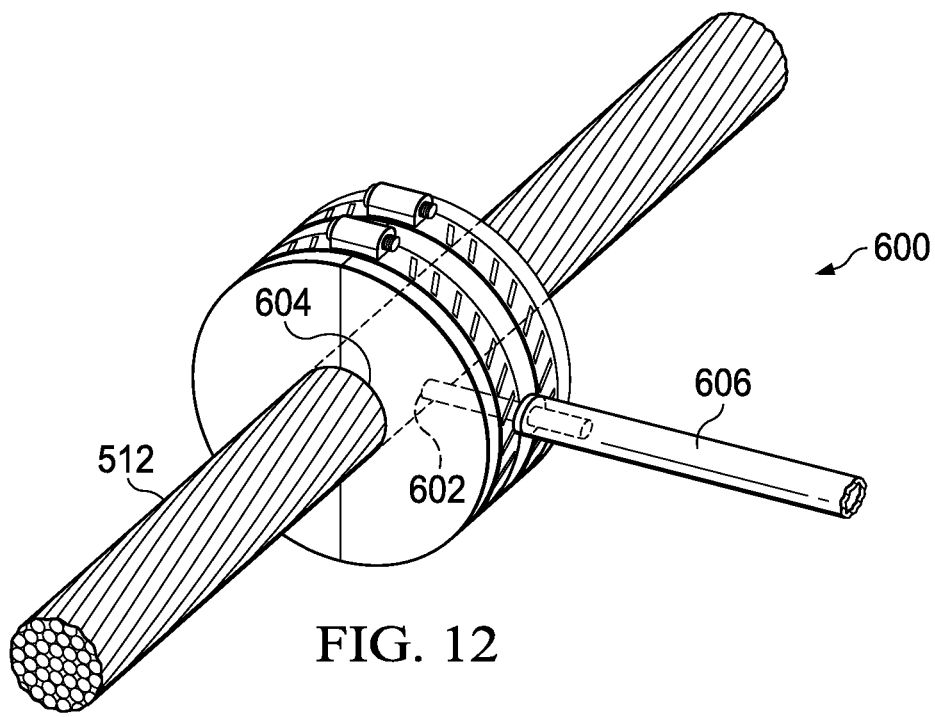
FIG. 12 is a drawing showing a plan view of the flooded die of FIG. 11.
Figure 13:
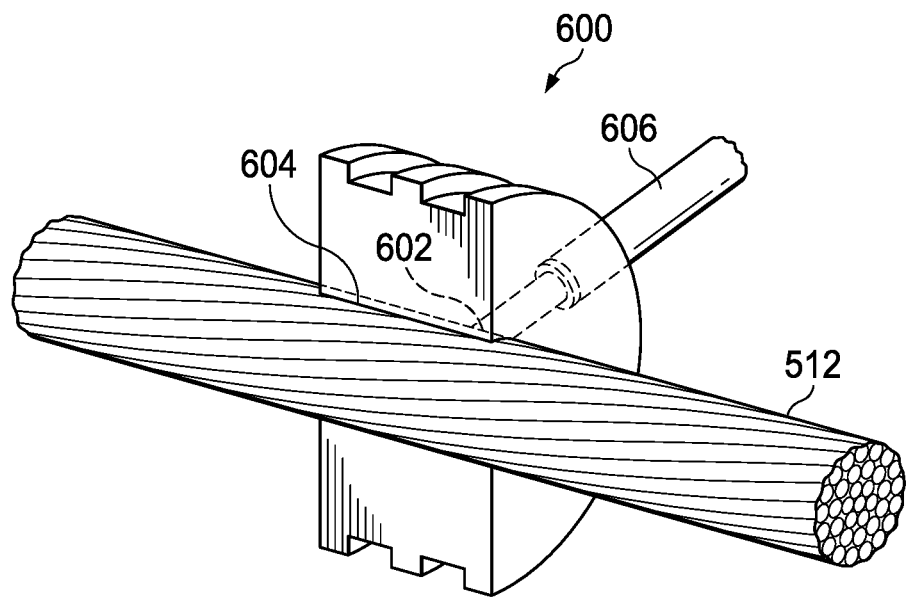
FIG. 13 is a drawing showing a cut-away view of the flooded die of FIG. 11.

Once the surface of the conductor 512 is prepared, it can be ready for coating. The coating process can take place in a coating unit where the cable passes through a flooded die that deposits a liquid suspension of the coating onto the prepared surface. FIGS. 11 to 13 depict an annular shaped flooded die 600. The coating suspension is fed to the die 600 via a tube 606. As the conductor 512 passes though the center opening 604 of the flooded die 600, the coating suspension coats the conductor 512 via opening ports in the inner surface 602 of the die 600. In certain embodiments, the flooded die 600 can contain two or more, four or more, or six or more, opening ports evenly spaced around the circumference of the inner surface 602. Once the conductor 512 exits the flooded die, it can then pass through another air wipe to remove excess coating suspension and to spread the coating evenly around the conductor. In the case of a stranded conductor, the air wipe allows the coating to penetrate the grooves between the strands on the surface of the conductor. This air wipe can operate under the same condition as that for the air wipe in the pretreatment unit 504.

Once the conductor 512 is coated, it can pass through the drying/curing unit 508. The drying/curing can be accomplished by air or by using hot air of the temperature of up to 1000° C. The line speed can be between about 9 feet/min to about 500 feet/min in certain embodiments, or about 10 feet/min to about 400 feet/min in certain embodiments. As can be appreciated, line speed can be varied depending on the metal alloy used in the conductor. According to certain embodiments, the drying process can include a gradual drying process, a rapid drying process, or a direct flame application process. Further, drying or curing also can be accomplished by other techniques, like a heating oven, UV, IR, E-beam, chemical, or liquid spray and the like. The drying can be accomplished by single or multiple units. It also can be performed at a vertical angle, a horizontal or at a specific angle. In certain embodiments, the drying/curing can occur by direct flame application. In such embodiments, the cable preferably can pass directly through a flame to heat the cable surface to a temperature of up to about 150° C. in certain embodiments, and up to about 120° C. in certain embodiments. Once dried/cured, the coated conductor can be wound on a roller 510 for storage.

The continuous process, if operated for an individual strand (instead of the whole cable), can operate at a line speed of up to about 2500 ft/min in certain embodiments, about 9 to about 2000 ft/min in certain embodiments, about 10 to about 500 ft/min in certain embodiments, and about 30 to about 300 ft/min in certain embodiments.

The coated conductor can exhibit improved heat dissipation. Emissivity is the relative power of a surface to emit heat by radiation, and can be expressed as the ratio of the radiant energy emitted by a surface to the radiant energy emitted by a blackbody at the same temperature. Emittance is the energy radiated by the surface of a body per unit area. Emissivity can be measured, for example, by the method disclosed in U.S. Patent Application Publication No. 2010/0076719 to Lawry et al., which is incorporated herein by reference.

Figure 14:
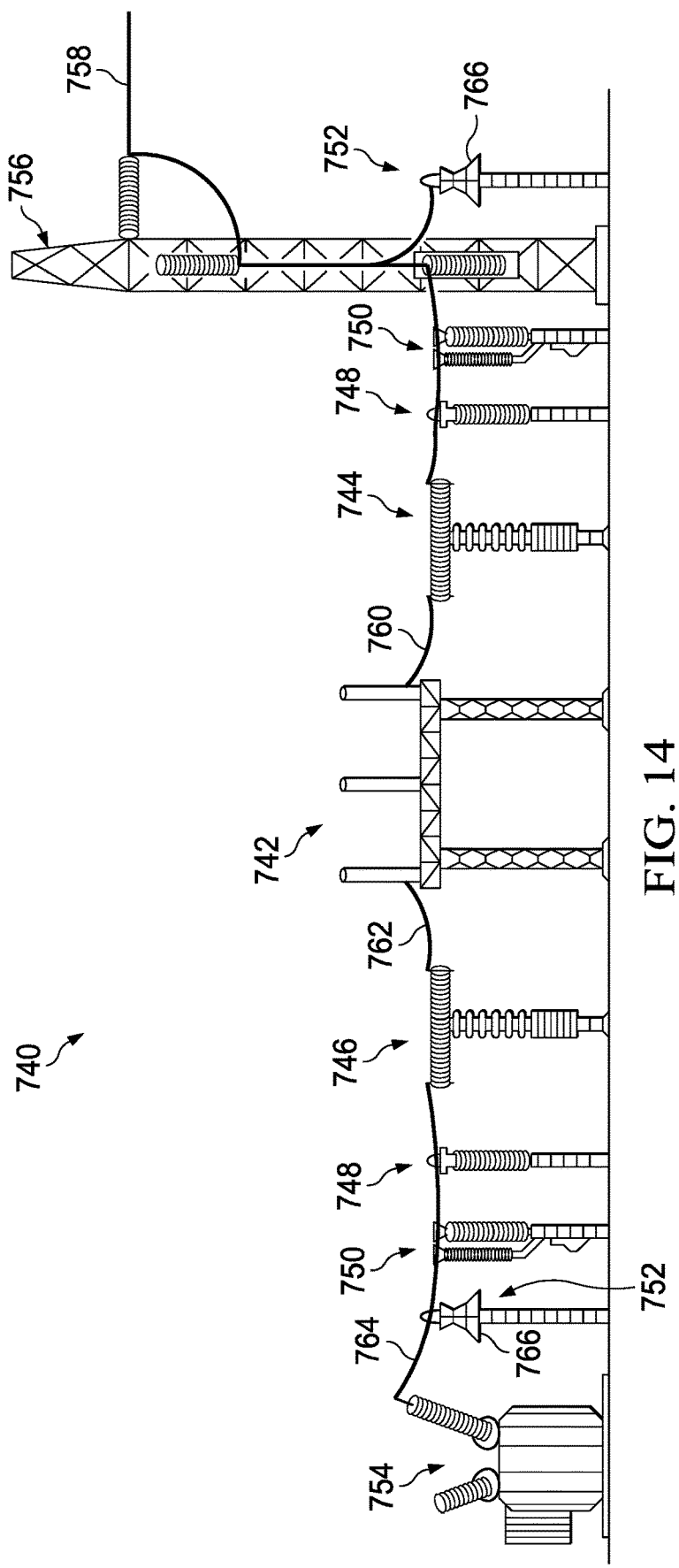
FIG. 14 is a schematic view of a substation for a power transmission system.

An example layout of a substation 740 for a power transmission system is illustrated in FIG. 14. The substation 740 includes a transmission bus 742 (i.e., busbars), a first breaker 744, a second breaker 746, a pair of current coupling transformers (CCT) 748, a pair of lightning arrestors 750, a pair of carrier current transceivers 752, a transformer 754, and a support structure 756. An overhead conductor 758 can be supported by the support structure 756 and can be electrically coupled with the first breaker 744. The overhead conductor 758 can be supported by, and electrically coupled with, one of the CCTs 748 and one of the lightning arrestors 750. The overhead conductor 758 can also be electrically coupled with one of the carrier current transceivers 752. Each of the first and second breakers 744, 746 can be in electrical communication with the transmission bus 742 via first and second conductors 760, 762. The second breaker 746 can be in electrical communication with the transformer 754 via a third conductor 764. The third conductor 764 can be supported by, and electrically coupled with, the other of the CCTs 748 and the lightning arrestors 750. The third conductor 764 can also be electrically coupled with the other of the carrier current transceivers 752. It is to be appreciated that only one phase of a transmission system is described above and that additional breakers, CCTs, lightning arrestors, a carrier current transceivers and/or transformers can be provided for additional phases of the transmission system.

In certain embodiments, the transmission bus 742 can be provided (i.e., coated) with a coating composition that is similar to, or the same, as the coating composition described herein for overhead conductors. When the transmission bus 742 is energized (e.g., by the overhead transmission conductor 758), the coating composition can facilitate an operational reduction in temperature of the transmission bus 742 as compared to a conventional transmission bus that is devoid of such a coating composition. It is to be appreciated that although the transmission bus 742 is shown to be an overhead bus, any of a variety of suitable alternative buses can be provided with a coating composition such as a low voltage bus (e.g., housed inside of the substation 740). A bus can be understood to be any elongate conductive element that can serve as a termination point for multiple conductors and is large enough (relative to the conductors) to carry large amounts of current (relative to the current through each individual conductor). In some embodiments, the bus can be a thick strip or hollow tube that is formed of copper or aluminum.

A coating composition can also be provided on energized components of each of the first and second breaker 744, 746, the current coupling transformers (CCTs) 748, the lightning arrestors 750, the carrier current transceivers 752, the transformer 754, and the first, second, and third conductors 760, 762, 764. The heat emissive coating can be provided (i.e., coated) to facilitate effective dispensation of heat therefrom. It is to be appreciated that a coating composition as described herein can be provided onto any of a variety of additional or alternative electrical accessories or components that are energizable to facilitate distribution of power. For example, a coating composition can be provided onto deadends/termination products, splices/joints products, suspension and support products, motion control/vibration products (also called dampers), guying products, wildlife protection and deterrent products, conductor and compression fitting repair parts, substation products, clamps, corona rings (e.g., 766 in FIG. 14), and other transmission accessories and/or other distribution accessories (e.g., products that are commercially available from a number of manufacturers such as Preformed Line Products (PLP), Cleveland, Ohio and AFL, Duncan, S.C.). In certain embodiments, the electrical accessories can be coated with the coating composition by the respective manufacturer prior to being sold to a customer, in certain embodiments, the electrical accessories can be coated with the coating composition by distributors before shipment to customers, and in certain embodiments, the electrical accessories can be coated with the coating composition after installation of the accessory and/or overhead conductor line is completed (e.g., at the substation). In such embodiments, the heat emissive coating can be cured by being exposed to ambient temperatures. It is noted that in certain embodiments, a coating composition can be applied to electrical accessories in a batch process, and in certain embodiments, a coating composition can be manually applied to the electrical accessory.

The coating compositions described herein can be applied to any metal substrate (for example, aluminum) which gets heated and needs to cool. The metal substrate can have a variety of shapes, such as flat, curved, multi-contoured, wire-shaped, or other desired shapes. In certain embodiments, the metal substrate can be aluminum, copper, copper alloy, aluminum alloy, aluminum-zirconium alloy, and combinations. The coating composition can provide superior corrosion resistance and durability to the metal substrate. Suitable example applications can include: window frames, door frames, doors, sills, roofing tiles, metal chimneys, refractory walls, transformer outer casing and any other metal component found in, or near, the building structures such as fences, swimming pool accessories or the like. In certain embodiments, the metal substrate can be energizable to facilitate the distribution of power. Additionally, the metal substrate can be metal components found on decks, outdoor furniture, or lawn and gardening equipment. As can be appreciated, in certain embodiments, only a portion of the outer surface of a metal substrate can be coated with a coating composition.

Without further description, it is believed that one of ordinary skill in the art can, using the preceding description and the following illustrative examples, make and utilize the articles of the present disclosure and practice the claimed methods. It should be understood that the invention is not to be limited to the specific conditions or details described in these examples.

EXAMPLES

Testing Procedures

Weathering Test: Samples were weathered in accordance to ASTM G155-05a (2013) by placing the samples in a chamber and cycling the exposed samples to light, moisture, and heat. Each cycle was 120 minutes and included 102 minutes of light from a daylight filtered xenon-arc lamp at 63° C., and 18 minutes of light and water spray. Samples were exposed for up to 10,000 hours and removed every 2,000 hours for testing.

Salt Spray Test: Salt spray testing was performed in accordance to ASTM 5 117-11/ISO-10289. One foot samples of ASCR conductor were used. The samples were exposed to a salt solution of 5% NaCl in a salt spray chamber and observed daily for the appearance of rust, corrosion, or any other visible change.

Heat/Humidity Test: Six samples (three of each uncoated and coated) were placed in a chamber. Samples were exposed to 85° C. and 85% humidity. Two samples (one of each uncoated and coated) were taken out after 30, 50 and 90 days respectively and performed the temperature reduction analysis.

Example 1

Computer simulation studies was performed using different E/A (Emissivity to Absorptivity ratio) values, to measure the reduction in operating temperature of the conductor for the same peak current. The E/A ratios were considered as the surface property of the conductor which is modified by coating. Table 1 tabulates the simulation results for various designs of overhead conductor:

TABLE 1

| | | | \multicolumn{7}{c}{Simulation Results} |
| --- | --- | --- | --- | --- | --- | --- | --- | --- | --- |
| | Symbol | Units | Case 1 | Case 2 | Case 3 | Case 4 | Case 5 | Case 6 | Case 7 |
| Simulation 1: Rail ACSR | | | | | | | | | |
| E/A Ratio | | E/A | .5/.5 | .3/.3 | .9/.9 | .7/.5 | .8/.4 | .9/.3 | .9/.2 |
| Number conductors per bundle | | | 1 | 1 | 1 | 1 | 1 | 1 | 1 |
| Peak Current (per conductor) | I | amps | 970 | 970 | 970 | 970 | 970 | 970 | 970 |

TABLE 1-continued

Simulation Results

|  | Symbol | Units | Case 1 | Case 2 | Case 3 | Case 4 | Case 5 | Case 6 | Case 7 |
|---|---|---|---|---|---|---|---|---|---|
| Sub-conductor temperature | Tc | ° C. | 74 | 75 | 73 | 70 | 67 | 64 | 63 |
| Sub-conductor Resistance at Tc | R | ohms/mile | 0.14 | 0.14 | 0.14 | 0.14 | 0.14 | 0.13 | 0.12 |
| Power Loss | PL | kW/mile | 115.37 | 115.60 | 115.03 | 113.92 | 112.68 | 111.52 | 111.03 |
| Simulation 2: Curlew ACSR | | | | | | | | | |
| E/A Ratio | | E/A | .5/.5 | .3/.3 | .9/.9 | .7/.5 | .8/.4 | .9/.3 | .9/.2 |
| Number conductors per bundle | | | 1 | 1 | 1 | 1 | 1 | 1 | 1 |
| Peak Current (per conductor) | I | amps | 1040 | 1040 | 1040 | 1040 | 1040 | 1040 | 1040 |
| Sub-conductor temperature | Tc | ° C. | 75 | 76 | 74 | 71 | 68 | 64 | 63 |
| Sub-conductor Resistance at Tc | R | ohms/mile | 0.11 | 0.11 | 0.11 | 0.11 | 0.11 | 0.11 | 0.11 |
| Power Loss | PL | kW/mile | 121.54 | 121.86 | 121.13 | 119.98 | 118.65 | 117.39 | 116.70 |
| Simulation 3: Lapwing ACSR | | | | | | | | | |
| E/A Ratio | | E/A | .5/.5 | .3/.3 | .9/.9 | .7/.5 | .8/.4 | .9/.3 | .9/.2 |
| Number conductors per bundle | | | 1 | 1 | 1 | 1 | 1 | 1 | 1 |
| Peak Current (per conductor) | I | amps | 1335 | 1335 | 1335 | 1335 | 1335 | 1335 | 1335 |
| Sub-conductor temperature | Tc | ° C. | 75 | 76 | 74 | 71 | 67 | 64 | 62 |
| Sub-conductor Resistance at Tc | R | ohms/mile | 0.08 | 0.08 | 0.08 | 0.07 | 0.07 | 0.07 | 0.07 |
| Power Loss | PL | kW/mile | 134.28 | 134.63 | 133.83 | 132.55 | 131.08 | 129.71 | 129.03 |
| Simulation 4: Bluebird ACSR | | | | | | | | | |
| E/A Ratio | | E/A | .5/.5 | .3/.3 | .9/.9 | .7/.5 | .8/.4 | .9/.3 | .9/.2 |
| Number conductors per bundle | | | 1 | 1 | 1 | 1 | 1 | 1 | 1 |
| Peak Current (per conductor) | I | amps | 1620 | 1620 | 1620 | 1620 | 1620 | 1620 | 1620 |
| Sub-conductor temperature | Tc | ° C. | 75 | 76 | 74 | 70 | 67 | 63 | 61 |
| Sub-conductor Resistance at Tc | R | ohms/mile | 0.06 | 0.06 | 0.06 | 0.05 | 0.05 | 0.05 | 0.05 |
| Power Loss | PL | kW/mile | 145.76 | 146.11 | 145.28 | 143.87 | 142.32 | 140.87 | 140.14 |
| Simulation 5: Drake ACSR | | | | | | | | | |
| E/A Ratio | | E/A | .5/.5 | .3/.3 | .9/.9 | .7/.5 | .8/.4 | .9/.3 | .9/.2 |
| Number conductors per bundle | | | 1 | 1 | 1 | 1 | 1 | 1 | 1 |
| Peak Current (per conductor) | I | amps | 900 | 900 | 900 | 900 | 900 | 900 | 900 |
| Sub-conductor temperature | Tc | ° C. | 74 | 75 | 73 | 70 | 67 | 64 | 62 |
| Sub-conductor Resistance at Tc | R | ohms/mile | 0.14 | 0.14 | 0.14 | 0.14 | 0.14 | 0.13 | 0.13 |
| Power Loss | PL | kW/mile | 112.42 | 112.63 | 112.07 | 110.97 | 109.79 | 108.66 | 108.05 |

Other conditions Ambient Temperature: 25° C., Wind Speed: 2 ft/s

Example 2

Figure 5:
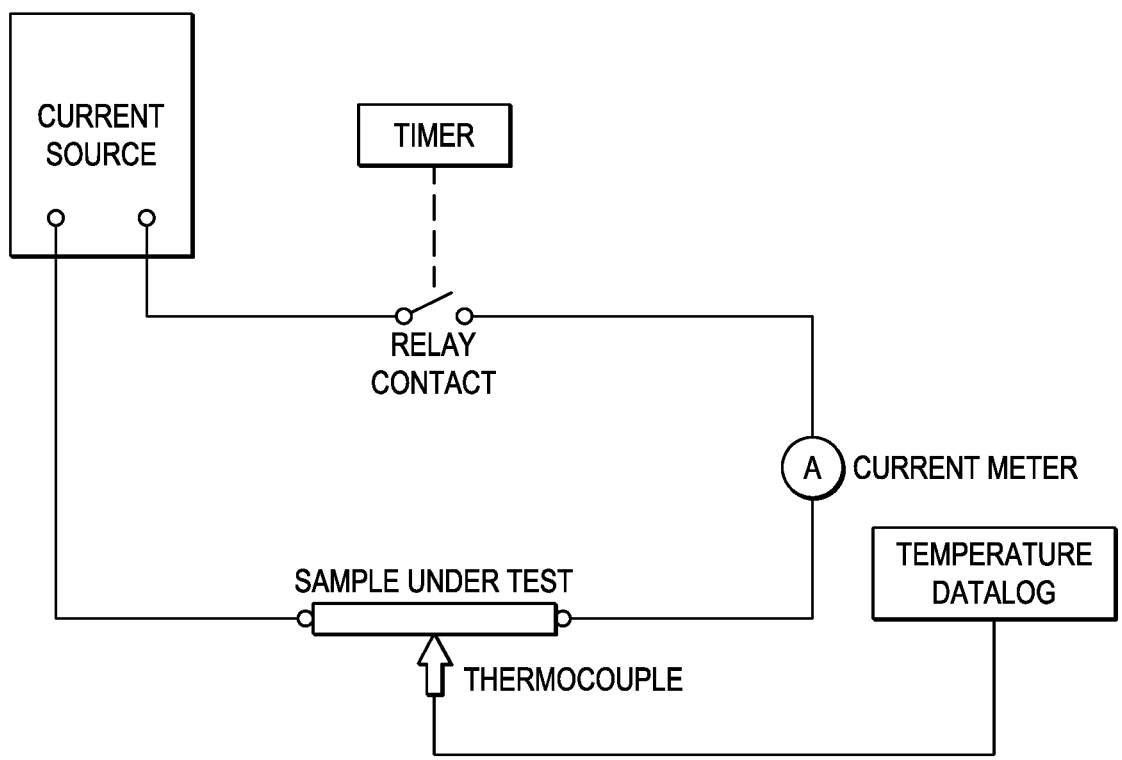
FIG. 5 is a drawing showing the test arrangement to measure the temperature of metal substrates for a given applied current.

A coating was prepared by mixing Sodium silicate (20 weight %), Silicon dioxide (37 weight %) with Boron Carbide as a heat radiating agent (3 weight %) and Water (40 weight %). The coating composition is applied to a metal substrate having an emissivity of higher than 0.85. A current is applied through the metal substrate with a 1 mil coating thickness and an uncoated metal substrate to measure the performance improvement of the coating. The test apparatus is shown in FIG. 5 and mainly consisted of a 60 Hz ac current source, a true RMS clamp-on current meter, a temperature datalog device and a timer. Testing was conducted within a 68" wide×33" deep windowed safety enclosure to control air movement around the sample. An exhaust hood was located 64" above the test apparatus for ventilation.

The sample to be tested was connected in series with an AC current source through a relay contact controlled by a timer. The timer was used to activate the current source and controlled the time duration of the test. The 60 Hz ac current flowing through the sample was monitored by a true RMS clamp-on current meter. A thermocouple was used to measure the surface temperature of the sample. Using a spring clamp, the tip of the thermocouple was kept firmly in contacted with the center surface of the sample. In case of measurement on coated sample, the coating was removed at the area where thermocouple made the contact with the sample to get accurate measurement of the temperature of the substrate. The thermocouple temperature was monitored by a datalog recording device to provide a continuous record of temperature change.

Both uncoated and coated substrate samples were tested for temperature rise on this test set-up under identical experimental conditions. The current was set at a desired level and was monitored during the test to ensure a constant current is flowing through the samples. The timer was set at a desired value and the temperature datalog recording device was set to record temperature at a recording interval of one reading per second.

The metal component for the uncoated and coated samples was from the same source material and lot of Aluminum 1350. The finished dimensions of the uncoated sample were 12.0"(L)×0.50"(W)×0.027"(T). The finished dimensions of the coated samples were 12.0"(L)×0.50"(W)×0.029"(T). The increase in thickness and width was due to the thickness of the applied coating.

The uncoated sample was firmly placed into the test set-up and the thermocouple secured to the center portion of the sample. Once that was completed, the current source was switched on and was adjusted to the required ampacity load level. Once that was achieved the power was switched off. For the test itself, once the timer and datalog device were all properly set, the timer was turned on to activate the current source, thus, starting the test. The desired current flowed through the sample and the temperature started rising. The surface temperature change of the sample was automatically recorded by the datalog device. Once the testing period was completed, the timer automatically shut down the current source, thus, ending the test.

Once the uncoated sample was tested, it was removed from the set-up and replaced by the coated sample. The testing resumed, making no adjustments to the power supply current device. The same current level was passed through the coated sample.

Figure 6:
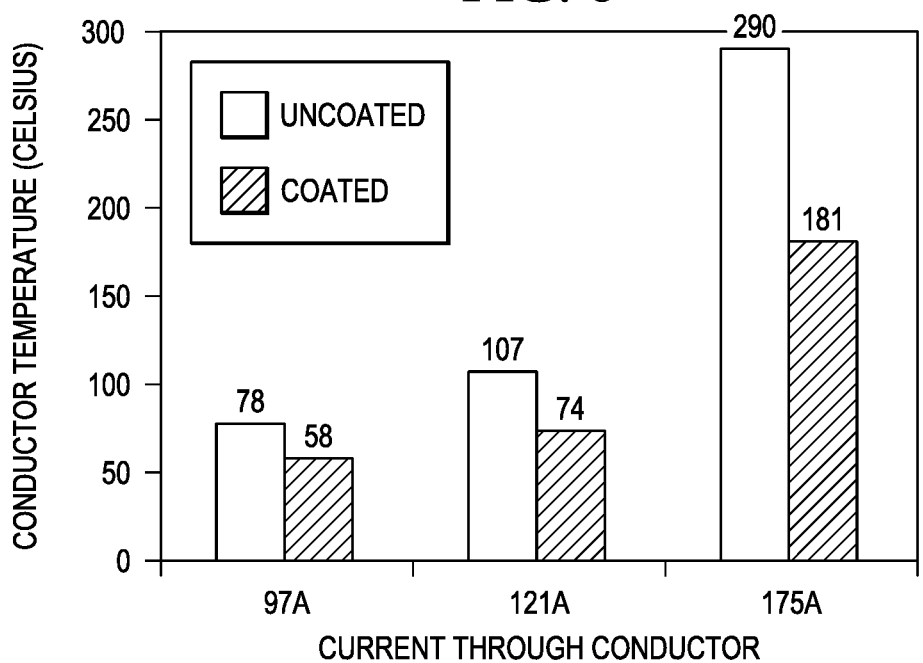
FIG. 6 is a graph showing the temperatures of coated and uncoated conductors.

The temperature test data was then accessed from the datalog device and analyzed using a computer. Comparing the results from the uncoated sample tests with those from the coated tests was used to determine the comparative emissivity effectiveness of the coating material. The results of the test are shown in FIG. 6.

Example 3

Wind effects on temperature rise of the two #4 AWG solid aluminum coated conductors were evaluated at a current of 180 amps. A fan with three speeds was used to simulate the wind and the wind blew directly to the conductor being tested from 2 feet away. The test method circuit diagram is showed in FIG. 7. Both coated and uncoated conductors were tested under 180 amps, solar light, and wind; and the test results are shown in Table 2. The coated conductor was 35.6%, 34.7% and 26.1% cooler than the uncoated when subjected to no wind, low wind, and high wind, respectively. The speed of the wind had a little impact on the coated conductor but a 13% impact on the uncoated.

TABLE 2

Wind effect on coated and uncoated conductor's temperature at 180 amps.

| 180 amps | Temperature Rise (° C.) | | | |
|---|---|---|---|---|
| | Uncoated | Coated | Difference | Difference (%) |
| No Wind | 174 | 112 | 62 | 35.6 |
| Low Wind | 101 | 66 | 35 | 34.7 |
| High Wind | 88 | 65 | 23 | 26.1 |

Wind effects on temperature rise of the two #4 AWG solid aluminum conductors were evaluated at 130 amps current. The uncoated and coated conductors were tested under no wind, low wind and high wind, respectively, along with 130 amps current and solar light. The tests results are summarized in Table 3. The coated conductor was 29.9%, 13.3% and 17.5% cooler than the uncoated conductor when subjected to no wind, low wind and high wind respectively.

TABLE 3

Wind effect on coated and uncoated conductor's temperature at 130 amps

| 130 amps | Temperature Rise (° C.) | | | |
|---|---|---|---|---|
| | Uncoated | Coated | Difference | Difference (%) |
| No Wind | 108 | 76 | 32 | 29.9 |
| Low Wind | 60 | 52 | 8 | 13.3 |
| High Wind | 57 | 47 | 10 | 17.5 |

Example 4

Tests were performed on coated and uncoated 2/0 AWG solid aluminum and 795 kcmil AAC Arbutus conductor samples. The Current Cycle Test method was performed in accordance with ANSI C119.4-2004 as adapted herein.
Conductor Test Samples:
1) 2/0 AWG Solid Aluminum Conductor coated with coating composition disclosed in Example 2. Thickness of the coating is 1 mil.
2) Uncoated 2/0 AWG Solid Aluminum Conductor
3) 795 kcmil Arbutus All-Aluminum Conductor coated with coating composition disclosed in Example 2. Thickness of the coating is 1 mil.
4) Uncoated 795 kcmil Arbutus All-Aluminum Conductor
5) Aluminum Plate (electrical grade bus)

Figure 7:
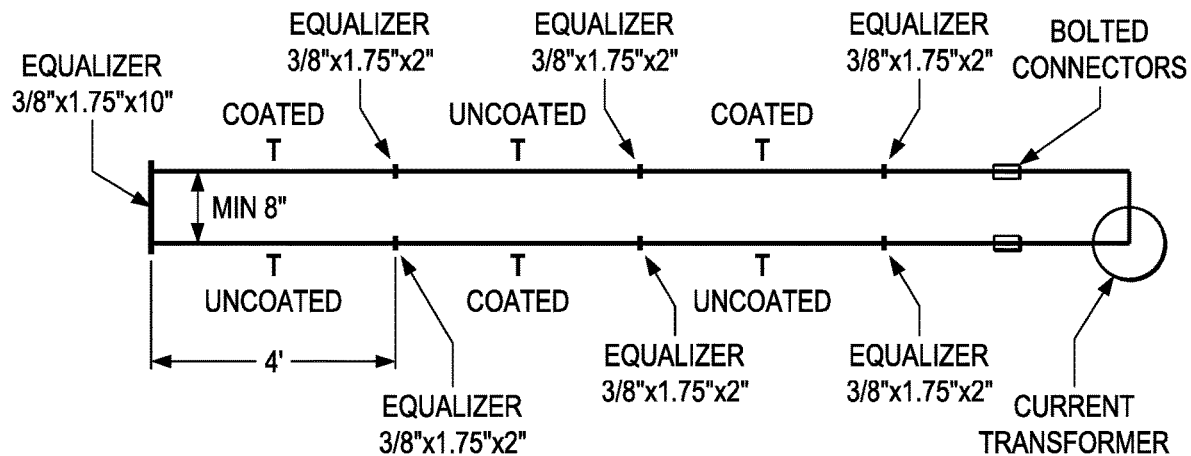
FIG. 7 is a drawing showing the test arrangement to measure the temperature difference of metal substrates in series loop system for a given applied current.
Figure 7:
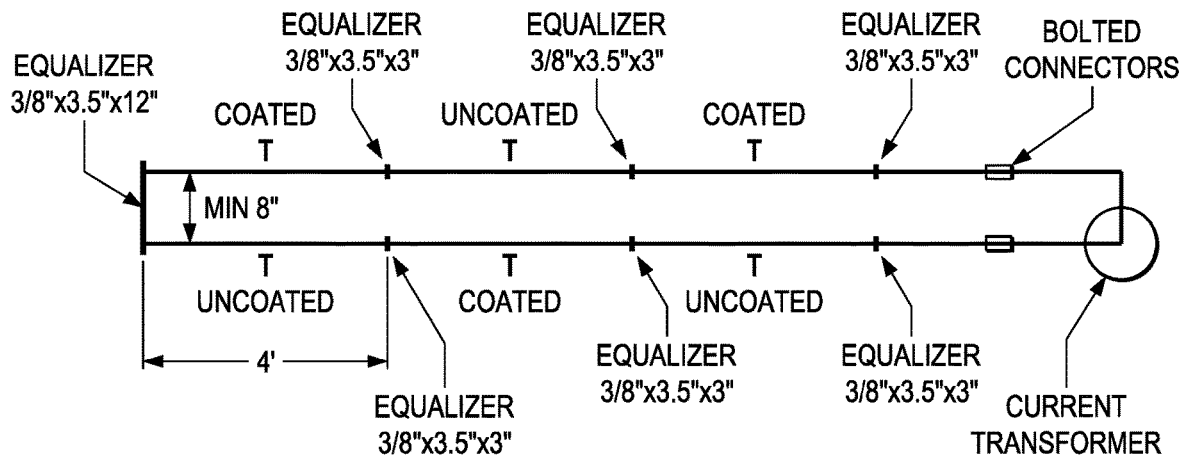

TEST LOOP ASSEMBLY: A series loop was formed with six identically sized four foot conductor specimens (three uncoated and three coated), plus an additional suitable conductor routed through the current transformer. The series loop consisted of two runs of three identically sized conductor specimens, alternating between coated and uncoated, welded together with an equalizer installed between conductor specimens to provide equipotential planes for resistance measurements. The equalizers ensured permanent contacts between all conductor strands. Equalizers (2"×⅜"×1.75" for 2/0 solid aluminum and 3"×⅜"×3.5" for 795 AAC Arbutus) were fabricated from aluminum bus. Holes the size of the connecting conductor were drilled into the equalizers. Adjacent conductor ends were welded to the equalizers to complete the series loop. A larger equalizer (10"×⅜"×1.75" for 2/0 solid aluminum and 12"×⅜"×3.5" for 795 AAC Arbutus) was used at one end to connect the two runs, while the other end was connected to an additional conductor routed through the current transformer. The loop configuration is depicted in FIG. 7.

The test loop assembly was located at least 1 ft. from any wall and at least 2 ft. from the floor and ceiling. Adjacent loops were located at least 1 ft. from each other and were energized separately.

TEMPERATURE MEASUREMENT: The temperature of each conductor specimen was monitored simultaneously at specified intervals over the course of the test. The temperature was monitored using Type T thermocouples and a Data Logger. One thermocouple was attached to the each conductor at midpoint on the specimen in the 12 o'clock position. One specimen of each sample had additional thermocouples connected to the sides of the specimen at the 3 and 6 o'clock positions. One thermocouple was located adjacent to the series loop for ambient temperature measurements.

CURRENT SETTING: The conductor current was set at appropriate ampacity to produce a temperature of 100° C. to 105° C. above ambient air temperature at the end of a heating period for the uncoated conductor specimen. Since the uncoated conductor and the coated conductor were placed in series in the test assembly, the same current passed through both samples. The first few heat cycles were used to set the proper ampacity to produce the desired temperature rise. A heat cycle consisted of one hour of heating followed by one hour of cooling for the 2/0 AWG solid aluminum loop, and one and a half hours of heating followed by one and a half hours of cooling for the 795 stranded aluminum loop.

TEST PROCEDURE: The test was conducted in accordance with the Current Cycle Test Method, ANSI C119.4-2004, except that the test was performed for a reduced number of heat cycles (at least fifty cycles were performed). Ambient temperature was maintained at ±2° C. Temperature measurements were recorded continuously during the heat cycles. Resistance was measured at the end of the heating cycle and prior to the next heating cycle, after the conductor returned to room temperature.

Figure 8:
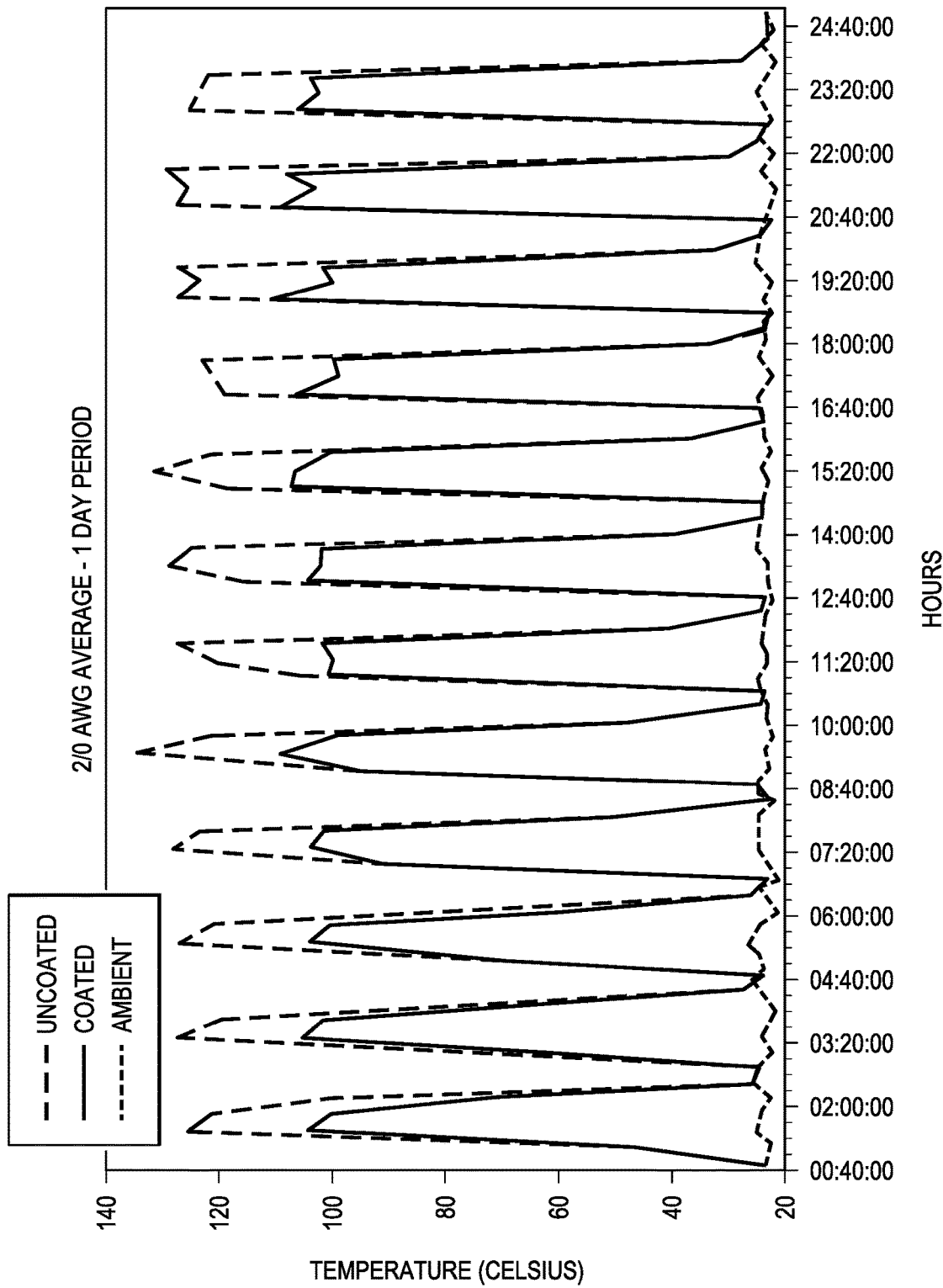
FIG. 8 is a graph showing temperatures of 2/0 AWG Solid Aluminum Conductors.
Figure 9:
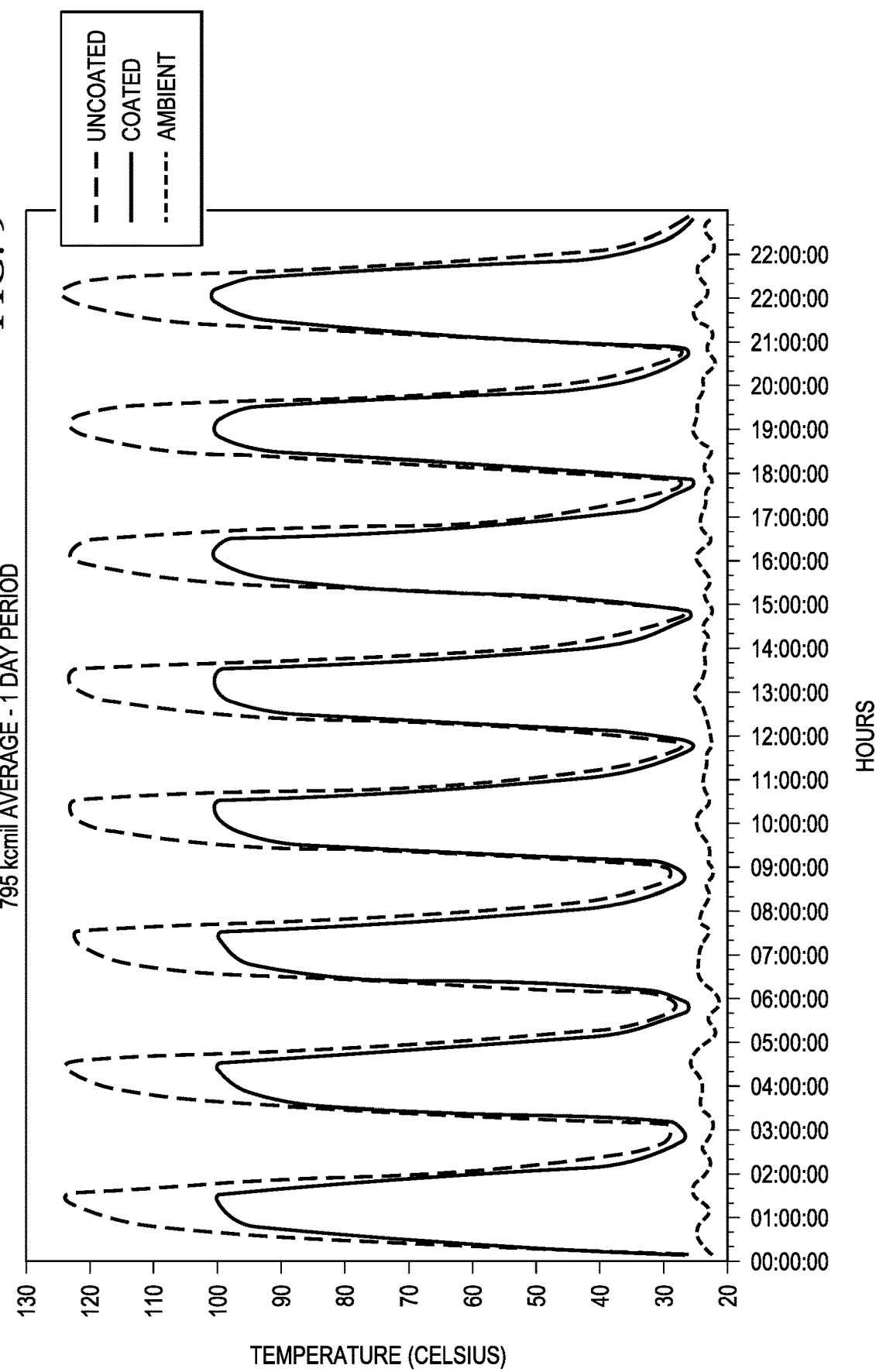
FIG. 9 is a graph showing temperatures of 795 kcmil Arbutus All-Aluminum Conductors.

TEST RESULT: The coated 2/0 AWG Solid Aluminum Conductor and 795 kcmil Arbutus All-Aluminum Conductor showed lower temperatures (more than 20° C.) than the uncoated conductors. The temperature difference data were captured in FIG. 8 and FIG. 9, respectively.

Example 5

An aluminum substrate was coated with various coating compositions as described below and summarized in Table 4. The coating compositions have a color spectrum ranging from white to black.

Aluminum Control: Uncoated aluminum substrate made from 1350 Aluminum Alloy.

Coating 2: Polyurethane based coating having solids content of 56 weight %, available from Lord Corporation as grade Aeroglaze A276.

Coating 3: Coating containing 72.5 weight % of Sodium silicate solution in water (containing 40% solid) and 12.5 weight % of Aluminum Nitride AT powder (having particle size distribution of D 10% 0.4 to 1.4 microns, D 50% 7 to 11 microns, D 90% 17 to 32 microns) available from H.C. Starck, 12.5 weight % of Silicon carbide and 2.5 weight % of reactive amino silicone resin (grade SF1706) available from Momentive Performance Material holding Inc.

Coating 4: Coating containing 87.5 weight % of Silicone based coating (Grade 236) available from Dow corning and 12.5 weight % of Silicon carbide.

Coating 5: Coating containing Silicate binder (20 weight %), Silicon dioxide (37 weight %) and Boron Carbide (3 weight %) and Water (40 weight %)

Coating 6: Coating containing Potassium silicate (30 weight %), Tri Calcium Phosphate (20% weight %), Mixed metal oxide pigment (5%) and Water (45%)

Color of the samples was measured on the L*, a*, b* scale using Spectro-guide 45/0 gloss made by BYK-Gardner USA.

Samples were tested for Solar Reflectance (R) and Absorptivity (A) as per ASTM E903. Emissivity (E) of the samples was measured as per ASTM E408 at the temperature of 300K. The aluminum substrate of 50 mm length×50 mm width×2 mm thickness coated with 1 mil thickness coating were used for the measurements of Solar Reflectance, Absorptivity, Emissivity.

The coated samples were tested for their ability to reduce operating temperature of the conductor when compared to a bare aluminum substrate as described in Example 2 using electrical current setting of 95 amps. To study the effect of solar energy on the operating temperature of the conductor, light bulb simulating solar energy spectrum was placed above the test sample in addition to the electrical current applied to the test sample and the test sample temperature was recorded. Standard Metal Halide 400 Watt Bulb (Model MH400/T15/HOR/4K) was used. Distance between the lamp and the bulb was maintained at 1 ft. The results are tabulated as "Electrical+Solar". Results with the light bulb turned off while electrical current turned on are tabulated as "Electrical".

Heat aging performance of the coating was carried out by placing the samples in an air circulating oven maintained at 325° C. for a period of 1 day and 7 days. After the heat aging was complete, the samples were placed at room temperature of 21° C. for a period of 24 hours. The samples were then bent on different cylindrical mandrels sized from higher diameter to lower diameter and the coatings were observed for any visible cracks at each of the mandrel size. Sample was considered as "Pass" if it showed no visible cracks when bent on mandrels having a diameter of 0.5 inch or more, or diameters of 10 inches or less.

TABLE 4

| | 1 | 2 | 3 | 4 | 5 | 6 |
|---|---|---|---|---|---|---|
| Coating Type | — | Organic | Inorganic | Inorganic | Inorganic | Inorganic |
| Coating Binder | Uncoated | PU | Silicate | Methyl Silicone | Silicate | Silicate |
| Visual Color | — | White | Gray | Gray | Dark Gray | Black |
| Measured Color Values | | | | | | |
| L* | — | 92.65 | 67.48 | 60.12 | 43.495 | 15.54 |
| a* | — | −1.7 | −0.8 | −1.68 | −0.49 | 0.17 |
| b* | — | 0.075 | 2.41 | −4.04 | −2.015 | −0.13 |
| Solar Reflectance (R) | 0.701 | 0.74 | 0.35 | 0.21 | 0.14 | 0.02 |
| Emissivity (E) | 0.161 | 0.847 | 0.86 | 0.86 | 0.882 | 0.91 |
| Temperature Reduction | | | | | | |
| Electrical | 109 | 89.3 (19.7%) | 68 (41%) | 64 (45%) | 89.5 (19.5%) | 84 (25%) |
| Electrical + Solar | 117.5 | 90.5 (22.9%) | 77 (40%) | 71 (46.5%) | 92 (21.7%) | 86.5 (26.2%) |
| Flexibility: Mandrel Bend Test at 0.5 inch | | | | | | |
| Initial (before heat aging) | — | Pass | Pass | Pass | Pass | Pass |
| After Heat Aging at 325° C. (1 Day) | — | Fail | Pass | Pass | Pass | Pass |
| After Heat Aging at 325° C. (7 Days) | — | Fail | Pass | — | Pass | Pass |

The coatings in samples 3-6 in Table 4 can be used for such overhead conductors and electrical accessories described herein, so that such articles can pass the Salt Spray Test, Weathering Test and/or Heat/Humidity Test. During each 2,000 hour testing cycle for the Weathering Test the coated articles were also found to maintain the desired reduction in operating temperature, which was before the weathering conditions exposure. Also, during each 30, 60 and 90 days testing cycle for the Heat/Humidity test coated articles were also found to maintain the desired reduction in operating temperature, which was before the weathering condition exposure.

Example 6

As noted herein, a coating composition can be applied to aged conductors and composite core conductors. Temperature reduction results for both an aged conductor and composite core conductor each being coated with a silicate coating as described herein are provided below in Table 5.

TABLE 5

30 year used 795 kcmil ACSR Drake Conductor
Temperature measurement at Steady current of 1034 Amp and ambient temperature of 22° C.

|  | Uncoated | Coated | % Reduction |
|---|---|---|---|
| Temperature (° C.) | 123.8 | 100.8 | 18.6 |

ACC TW Composite Core Conductor
Temperature measurement at Steady current of 1950 Amp and Ambient temperature of 23.8° C.

|  | Uncoated | Coated with Coating Composition 3 | % Reduction |
|---|---|---|---|
| Temperature (° C.) | 175.3 | 133.8 | 23.7 |

Example 7

A flat aluminum busbar having a dimension of 0.325 inch by 2 inches was coated with a Coating Composition 3 as described below and summarized in Table 6.

As illustrated in Table 6, the average operating temperature of an uncoated (e.g., bare) busbar for Cycle 1 was 110.9° C., while the average operating temperature of a busbar coated with the silicate coating described above for Cycle 1 was 72.4° C., which represents about a 34.7% reduction with respect to the operating temperature of the uncoated busbar. Also, as shown in Table 6, the average operating temperature of an uncoated (e.g., bare) busbar for Cycle 2 was 110.5° C., while the average operating temperature of a busbar coated with the silicate coating described above for Cycle 2 was 73.1° C., which represents about a 33.7% reduction with respect to the operating temperature of the uncoated busbar. Finally, as illustrated in Table 6, the average operating temperature of an uncoated (e.g., bare) busbar for Cycle 3 was 110.3° C., while the average operating temperature of a busbar coated with the silicate coating described above for Cycle 3 was 72.0° C., which represents about a 34.5% reduction with respect to the operating temperature of the uncoated busbar. The operating temperatures of each of the samples included in Cycles 1, 2 and 3 where evaluated at the ambient temperatures and at the applied current respectively noted in Table 6.

TABLE 6

|  |  | Operating Temp. of Uncoated Busbar (° C.) | Operating Temp. of Busbar with Silicate Coating (° C.) | % Reduction in Operating Temp. | Ambient Temp. (° C.) | Current Applied (amps) |
|---|---|---|---|---|---|---|
| Cycle 1 | Average | 110.9 | 72.4 | 34.7 | 26.4 | 959.6 |
|  | Standard Deviation | 1.04 | 0.76 |  |  |  |
| Cycle 2 | Average | 110.5 | 73.1 | 33.7 | 25.7 | 979.8 |
|  | Standard Deviation | 1.15 | 1.07 |  |  |  |
| Cycle 3 | Average | 110.3 | 72.0 | 34.5 | 26.0 | 963.4 |
|  | Standard Deviation | 1.15 | 0.72 |  |  |  |

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A coated electrical accessory energizable to facilitate distribution of power, the coated electrical accessory comprising:
   a bare electrical accessory, and
   a substantially inorganic and dried coating layer coating the bare electrical accessory, said coating layer comprising a binder and a heat radiating agent and having a solar absorptivity coefficient of 0.3 or less, the binder comprising from about 20% to about 60%, by dry weight, of the coating layer, and the binder comprising a metal silicate selected from the group consisting of sodium silicate, potassium silicate, lithium silicate, or combinations thereof; and
   wherein when tested in accordance with ANSI C119.4-2004, the operating temperature of the coated electrical accessory is lower than the operating temperature of the bare electrical accessory when the same current is applied.

2. The coated electrical accessory of claim 1, wherein the operating temperature of the coated electrical accessory is reduced by about 5° C. or more when compared to the operating temperature of the bare electrical accessory.

3. The coated electrical accessory of claim 1 conducts higher amperage than the bare electrical accessory when operated at the same voltage.

4. The coated electrical accessory of claim 1 passes the Mandrel Bend Test after heat aging at 325° C. for 1 day.

5. The coated electrical accessory of claim 1 passes the Mandrel Bend Test after heat aging at 325° C. for 7 days.

6. The coated electrical accessory of claim 1, wherein said coating layer comprises less than 5%, by weight, of organic material.

7. The coated electrical accessory of claim 1, wherein said coating layer has a heat emissivity coefficient of about 0.75 or greater.

8. The coated electrical accessory of claim 1, wherein said coating layer has a coefficient of thermal expansion of about $10 \times 10^{-6}/°C$. to about $100 \times 10^{-6}/°C$. when measured over a temperature range of 0° C. to 250° C.

9. The coated electrical accessory of claim 1, wherein said coating layer, when applied to the bare electrical accessory, comprises a thickness from about 5 microns to about 30 microns.

10. The coated electrical accessory of claim 1, wherein the heat radiating agent comprises one or more of gallium oxide, cerium oxide, zirconium oxide, zinc oxide, magnesium oxide, silicon dioxide, manganese oxide, chromium oxides, iron oxide, copper chromium oxide, alumina, magnesium oxide, calcium oxide, and combinations thereof.

11. The coated electrical accessory of claim 1, wherein the heat radiating agent comprises from about 1% to about 30%, by dry weight, of said coating layer.

12. The coated electrical accessory of claim 1, wherein said coating layer further comprises one or more of fillers, stabilizers, colorants, surfactants and infrared reflective additives.

13. The coated electrical accessory of claim 1, wherein said coating layer is formed from a water-based coating composition.

14. The coated electrical accessory of claim 1, wherein the bare electrical accessory is aged due to use prior to being coated with said coating layer.

15. The coated electrical accessory of claim 1 comprises one or more of a transmission bus, a termination component, a joints component, a suspension and support component, a motion control component, a guying component, a wildlife protection and deterrent component, a conductor and compression fitting repair component, a substation component, a clamping component, and a corona ring component.

16. A coated electrical accessory energizable to facilitate distribution of power, the coated electrical accessory comprising:
   a bare electrical accessory, and
   a substantially inorganic and dried coating layer coating the bare electrical accessory, said coating layer comprising a binder and a heat radiating agent and having a solar absorptivity coefficient of 0.3 or less, the binder comprising from about 15% to about 65%, by dry weight, of the coating layer, and the binder comprising a metal silicate selected from the group consisting of sodium silicate, potassium silicate, lithium silicate, or combinations thereof; and
   wherein when tested in accordance with ANSI C119.4-2004, the operating temperature of the coated electrical accessory is reduced by 5° C. or more when compared to the operating temperature of the bare electrical accessory when the same current is applied, and wherein the coated electrical accessory passes the Mandrel Bend Test after heat aging at 325° C. for 1 day.

* * * * *